(12) United States Patent
Korotaev et al.

(10) Patent No.: US 9,274,958 B1
(45) Date of Patent: Mar. 1, 2016

(54) SYSTEM AND METHOD FOR CACHE MANAGEMENT IN SYSTEMS THAT INTERFACE TO CLOUD STORAGE

(71) Applicant: Parallels IP Holdings GmbH, Schaffhausen (CH)

(72) Inventors: Kirill Korotaev, Moscow (RU); Oleg Volkov, Moscow (RU); Alexey Kuznetzov, Moscow (RU); Stanislav S. Protassov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 182 days.

(21) Appl. No.: 14/170,095

(22) Filed: Jan. 31, 2014

Related U.S. Application Data (60) Provisional application No. 61/759,877, filed on Feb. 1, 2013.

(51) Int. Cl.
*G06F 12/00* (2006.01)
*G06F 12/08* (2006.01)
*G06F 12/12* (2006.01)
*G06F 12/02* (2006.01)

(52) U.S. Cl.
CPC .......... *G06F 12/0808* (2013.01); *G06F 12/122* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 2014/0115089 A1* | 4/2014 | Maybee | G06F 17/30466 709/213 |
| 2015/0242311 A1* | 8/2015 | Bulkowski | G06F 12/0246 711/103 |

* cited by examiner

*Primary Examiner* — Brian Peugh
(74) *Attorney, Agent, or Firm* — Bardmesser Law Group (57) ABSTRACT

A method and a system for cache management in system interfacing to a cloud storage. The cache has two layers: the filter layer for tracing read access to the data blocks and the cache layer for keeping the actual data blocks. The layer two consists of two modules—a main cache and a boot cache. The boot cache is filled during the short period of time after the first file open operation. The boot cache also has a limit on the amount of data that can be put into the cache for the particular file. The filter layer detects continuous read access pattern and avoids caching data, if the data is read continuously beyond some limit.

22 Claims, 5 Drawing Sheets

SYSTEM AND METHOD FOR CACHE MANAGEMENT IN SYSTEMS THAT INTERFACE TO CLOUD STORAGE

CROSS-REFERENCE TO RELATED APPLICATIONS

This application is a non-provisional application of U.S. Provisional Patent Application No. 61/759,877, filed Feb. 1, 2013, entitled SYSTEM AND METHOD FOR CACHE MANAGEMENT IN SYSTEM THAT INTERFACE TO CLOUD STORAGE, incorporated by reference herein in its entirety.

BACKGROUND OF THE INVENTION

1. Field of the Invention

The present invention is related to data management, and more particularly, to managing cache in the systems interfacing to cloud storage.

2. Description of the Related Art

A need to store data arises in every computer system. The amounts of data stored and the need for data access speed of computer storage grew dramatically recently, in both home and, especially, enterprise data storage solutions. Thus, computer storage systems are constantly improved for size and performance. Several techniques have been developed to speed up the storage systems.

One such technique relies on using multiple hard disk drives (HDDs) organized in array of networked storage such as Storage Area Network (SAN) or the like cloud disk structures. The clustered HDDs appear as a single data source to the user, but the system distributes the workload across the multiple drives with the help of a controller logic. This helps to spread data across a network and is relatively cost-effective.

A user can also move the data from networked HDDs to local storage and vice versa. This speeds up the computer storage, but is not effective from the view of the cloud in terms of separate users having the storage. Thus, in enterprise storage solutions, one should weigh the increased performance against the cost-effectiveness and size.

Another technique that can be used is caching in a cloud frequently used data to speed up the data access. For example, currently, some databases have a built-in caching mechanism that caches data in the RAM. The same mechanism can be used for Web and some other services. Caching technique is a lot more difficult to implement in the file systems, especially in enterprise systems and in cloud solutions. Accordingly, there is a need in the art for a mechanism to handle cached storage in systems that interface to cloud storages.

SUMMARY OF THE INVENTION

Accordingly, the present invention is directed to a system and method for managing an SSD cache that substantially obviates one or more of the problems in the related art.

HDDs have large capacities and are inexpensive. However, HDDs are slow in terms of data access. SSDs are fast, but have lower capacity and are expensive. Therefore, it is desired to place frequently used data on an SSD closer to a client, so the client spends less time accessing the data. The caching module has two layers: a filter for tracing and analyzing read access to the data blocks and a cache memory for keeping the actual data blocks. The cache memory consists of two similar modules—a main cache and a boot cache. There is a small part of cache memory assigned for the boot cache. In the exemplary embodiment, the boot cache may be completely filled with data in a couple minutes after starting a booting system, The boot cache is used primarily during start up, in order to cache data that is requested by the user at boot time or data stored on cluster disk storage. The boot cache is conceptually separated from the main cache to avoid important data being pushed out of the cache during startup.

which resides on the cluster storage (e.g., a VM), prior to getting a first read request requiring data caching. Then, the boot cache should be at least partially cleared for receiving new data. In the exemplary embodiment, the boot cache may have a limitation for the amount of data cached for one file or another data structure. Also, per user limitation can be established.

The main cache has no specific limits imposed on the amount of data, but for the data block to be placed in the main cache, it should be issued a read request more than once. The filter is responsible for selecting such blocks and issuing a command for storing block in the main cache.

Additionally, the filter layer detects continuous read access pattern and disables caching data in the boot cache if the data is read continuously beyond some limit. Such situation may occur as a result of backup tools execution, for example.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. In one aspect of the invention, an SSD cache is used for faster data access. According to the exemplary embodiment, Filesystem in Userspace (FUSE) is used. The FUSE is an operating system mechanism in a form of a driver or a daemon for Unix-like (or similar) computer operating systems that lets non-privileged users create their own file systems without editing the kernel code. This is achieved by running a file system code in a user space while the FUSE module provides only a "bridge" to the actual kernel interfaces.

The original, and commonly used implementation, involves a loadable kernel module. The FUSE system was originally a part of a Virtual File System (AVFS). The implementation of FUSE is available for Linux, FreeBSD, NetBSD (as puffs), OpenSolaris, Minix 3, Android and OS X. The FUSE is particularly useful for implementing virtual file systems. Unlike traditional file systems that essentially save data to and retrieve data from the disk, virtual file systems do not actually store data themselves. They act as a view, or translation, of an existing file system or a storage device.

In principle, any resource available to a FUSE implementation can be exported as a file system. The FUSE daemon or a client can be configured (via a command line) to maintain the local cache of frequently read data. One form of the cache configuration is addressed by the exemplary embodiment.

The data placed into the cache will be subsequently read from the local storage provided that the data has not been modified since then. If placed on the SSD such a cache can improve read performance significantly. The local cache is persistent, so it will retain data in a planned system shutdown or in a hibernation mode, but will be dropped in case of the system crash. An overview of the internal cache design is below.

According to the exemplary embodiment, a cache layer consists of two separate modules—a main cache and a boot cache. The modules are consist of files or iNodes and are initially configured to be placed on different physical memory storages. In a common case, the modules can be placed on the same physical storage and both files differ by their size. Most generally the boot cache and the main cache are placed in the same file and are used as portions of that file. The boot cache is placed on a fast (but usually expensive) device, while main cache resides on an appropriate mass storage device. The main cache works as a system cache, but can be additionally controlled for improving access speed or other performance issues.

According to one exemplary embodiment, the boot cache is used for launching a Virtual Private Server (VPS, such as Containers available from PARALLELS) or a Virtual Machine (VM). The snapshots of BIOS or other small files are loaded into the cache, which allows VM to start faster from the snapshots. Note that the purpose of the boot cache is to cache the data needed by a Virtual Machine or an application (such as a database) at the boot stages (e.g., MS Windows boot files or database system tables and indexes). Thus, the cache is aimed to speed up boot time required for a workload to start. The "boot" data is typically not present in the main cache, as it is used only once during the boot process.

The boot cache is filled during the short period of time after the first file open (2 minutes). It also has a limit on the amount of data that may be put in the cache for the particular file (for example, 128 MB or 1/32 of the cache size). The main cache is not limited in time or the amount of data, but for the data block to be placed onto the cache, it must be read at least twice. It is the filter layer that is responsible for selecting such blocks. Besides, the filter layer detects continuous read access patterns and avoids caching data, if it is read continuously beyond some limit (512K).

According to one exemplary embodiment, the cache layer is persistent. Thus, the entire cache content including the data blocks and the metadata are saved on a graceful shutdown and restored on a subsequent restart. The data stored in the cache are split onto 64K blocks. Every block saved is accompanied by the checksum array with 4 bytes CRC32 checksum stored per every page of the data (4096 bytes). The data, checksums and the metadata are stored in the single cache file. The size of the cache file can be configured via a command line. Every area of the cache file is aligned to the 64 KB boundary. The alignment size, block size and checksum page size are described in the cache file header, so they may be changed in the future.

Both filter and cache layers include similar cache modules. Every cache module (out of the 3) may include the block table and the file table (necessary to maintain cache consistency) and some associated data. The cache layer has the cached data blocks accompanied by the checksums associated with it while the filter layer has just last read access timestamp associated with every cache block. Writing to the data block invalidates it in all modules. In case the file was written by another client all its cached blocks is invalidated.

The block and the file reference tables have fixed size so the least recently used objects may be evicted by the recently added ones. Evicting the file from the corresponding table implicitly invalidates all its cached blocks. The design of the cache tables facilitates such a semantic, and having good performance and small memory footprint is a major challenge in cache development.

The access to the data area of the cache file is performed using direct I/O to avoid unnecessary load on the kernel cache. The data checksums area is accessed in a cached mode, since the size of the data being read and written is small here. The metadata—file header and block/file tables—are read on startup, kept in memory and ultimately written to a disk on daemon shutdown.

The exemplary embodiment uses a multi-way hash table. Both block and file tables in both cache layers are based on one and the same structure—the multi-way hash table. The hash table has fixed size pre-allocated buckets with eight entries. Every hash table entry has a copy of a key so searching the particular key is performed by comparing it with item's keys along the hash bucket whose index is calculated from the key's hash.

The items in the bucket form the LRU (least recently used) list, so the item can be popped up by moving it to the leftmost position in the bucket. In case a new item needs to be added, the first empty one can be used or the system overwrites the rightmost (oldest) used item. Then, the new item is usually being popped up in its bucket either immediately or after successful writing the associated data to a disk.

According to the exemplary embodiment, the hash items do not have pointers to memory, so they can be efficiently read and written directly from/to external storage as continuous stream of data. Additionally, they can efficiently maintain references to external data storage that stores the block data/checksums.

The external storage, which keeps data for the particular bucket, is addressed implicitly by the bucket index. In order to address the particular data item, every hash item has an index equal to the data item offset inside the bucket. Initially, all data items (and corresponding indexes) are arranged sequentially, but popping up items inside the bucket ultimately shuffles this array.

According to the exemplary embodiment, the file and block tables in both cache layers include the same 24 bytes structures. The block descriptor keeps file's unique id and the index of the 64 KB block counting from the beginning of the file. These two fields constitute the key uniquely identifying the particular block. The block index occupies 6 bytes (which is enough to address 256 Terabytes). The 2 left bytes are reserved for extra data facilitating addressing and maintaining of the associated data.

The first byte is occupied by the bucket offset discussed above. The second byte is reserved for the reference counter. The reference is added to the block on starting I/O to its associated data. The blocks that are being referenced cannot be evicted. Otherwise, concurrent I/O to the same block related to its different reincarnations can occur. The blocks being read may be accessed concurrently, while the blocks being written may be referenced only exclusively.

To distinguish between these two cases, the high order bit of the reference counter is used. Setting this bit to 1 marks the block as being dirty and locks the block for exclusive access. Note that it also automatically protects the reference counter from being overflowed by concurrent read requests. If there are too many requests, the block becomes exclusively locked, preventing readers from further references acquisition. On daemon startup, the system examines every descriptor by checking the bucket offset and the reference counter. The blocks with dirty bit set are invalidated immediately. Any other non-zero reference count is silently reset. The last field of the block descriptor is the generation of the cached block. For the valid block, it must match the generation of the file descriptor.

According to the exemplary embodiment, the file table descriptor uses the file unique ID as the key. Also, it keeps the exclusive lease generation for that file. This number is updated by a metadata server (MDS) on release of the exclusive lease issued for the file. The FUSE daemon receives the updated value on opening and closing the file. The generation update occurred on file close is obviously originated from the fuse itself so there is no need to invalidate the cache. On the other hand, the update detected on open means that some other clients have accessed the file on write, while the system did not keep it open.

Thus, the cached blocks must be invalidated in such cases. This means that storing the exclusive lease generation with every block cannot be maintained. That is why the separate generation number on each file and block descriptor need to be maintained. This cache generation number in the file descriptor is updated by setting it equal to the current exclusive lease generation when the cached content becomes invalid. On write access to the cached block, the system invalidates the block by setting generation to zero. The initial generation for the valid block is equal to the exclusive lease generation at the time of its creation.

The entire cache file is tagged by the header structure. The header contains a version number, as well as the various size constants and a number of buckets in the cache block and the file tables. The same number of buckets in block and file tables are used, keeping a space for 1 file descriptor per every cached block. Also, the descriptor keeps the CRC32 checksum of the block and file tables as well as the checksum of the constant part of header itself. Upon daemon startup procedure, the dirty bit in the flags field is set. On daemon shutdown, this bit is cleared after successful flushing of the metadata to disk. The cluster ID is also stored in the file header to prevent using old cache with new cluster which may lead to reading wrong data.

According to the exemplary embodiment, the cache can be operated in two modes—with checksum protection of the cached data and without it. The corresponding bit of the flags field is set accordingly on startup. The corresponding portion of the cache file is always reserved for storing checksums regardless if this feature is enabled or disabled. The cache file header is aligned to the 64 KB, as well as other parts of the file.

According to the exemplary embodiment, the cache is configured via the command line options of the daemon. The only mandatory option (for the cache to be used) is the cache file pathname: e.g., −C pathname. If the cache file is already exists and no other options are specified, the necessary parameters are read from the cache file header. In case the file does not exist, the new file size is determined automatically as free_space—10 Gb—total_space/10.

If the resulting size is less than 1 GB (for example), the cache will not be created. The read cache total size may be specified explicitly using the following option: −R Mbytes. In case the existing file has different size, it will be recreated, and the entire old cache content will be lost. The boot cache size can be specified using the following option: −B Mbytes. The default size is ⅛ of the total cache size. The −S option turns on the checksum protection, which is disabled by default. The cached data block size can be changed by means of the following option: −b Kbytes. The default block size is 64 KB.

Writing data to the cache should not disturb reading, so it has a lower priority. The writing to the cache is allowed if one of the following conditions is met:
  there are no reads in progress and less than 4 writes are in progress; and
  some reads are in progress, but not writes and at least 1 msec has elapsed since the last write.

According to the exemplary embodiment, to address cache buckets the simple Knuth's multiplicative hash is calculated as the sum of the file unique id and the index of the cache block (counted from beginning of the file) multiplied by a "magic" number, e.g., 2654435761.

The exemplary embodiment implements protection from a parallel cache use. Since it is possible to mount one and the same cluster more than once it is necessary to protect the cache file from being accessed by multiple daemon instances at a time. To accomplish this task, the daemon acquires an advisory lock on the cache file right after opening it. According to the exemplary embodiment, the daemon keeps track of sequential file access. Backup tools may stress cache by reading the entire file system content. Thus, the sequential reading patterns need to be detected in order to protect from such scenario.

Accordingly, the timestamps are generated for every block read access as an array of 16 bit numbers (expressing time in minutes) associated with the cache filtering layer. The high order bit is reserved for the sequential access flag set by the sequential read detection procedure.

The read is treated as sequential in case all blocks within the 512 KB prior to the current one have been accessed within the last 3 minutes. Such an algorithm allows for detection of even multiple concurrent sequential reads. The sequential read may only read data from the cache with some additional limitations (see below). The non-sequential access to the block with the sequential flag set does not cause the block to be cached—it just resets the sequential flag.

The exemplary embodiment implements forward lookups to avoid interlaced I/O patterns. Even if continuously read content is found, the system watches for the interlaced I/O patterns, wheresome data is read from the storage cluster with the gaps between address ranges of requested data blocks Such a pattern may seriously degrade I/O performance in comparison with the pure sequential read. So in case the read is sequential, the system forces the next 512 KB of the file data to be cached. Such a form of storage management improves overall system performance. On startup the system first checks the cache file header and creates a new empty cache, if necessary. If the header is correct and matches the desired cache parameters, the cache metadata is read. The important advantage of the exemplary cache implementation is that the entire cache table data may be saved to a disk and subsequently loaded without any significant processing. Thus, the system just calculates the checksum on metadata loading and compares it with the one saved in the file header. The last step checks the metadata for errors by means of verifying the bucket offsets and dropping the dirty data blocks. When loading is completed, the dirty bit in the cache file header is set and synced to the disk.

On shutdown, the metadata is saved to disk and the checksum is calculated at the same time. The system does not care about the completion of the writes in progress, since the time may be limited during the system shutdown. The corresponding dirty blocks are dropped on next cache load. Finally, the cache file is synced to the disk. Then, the dirty bit is cleared and the file is synced again.

According to the exemplary embodiment, the cache lookup is performed for the entire array of the file blocks accessed by the read request. First, every block in the filter layer is checked (looked up), as well as in the main and boot caches. If the file is not found in the filter, the system adds it and updates the access timestamp. The continuous reads are handled separately. The system allows for reading of the cached content on continuous read only if all requested blocks and the next 512 KB past the initial offset are in the cache. For non-sequential access one of the following conditions must be met:

some data blocks are in the cache; and
  all requested data blocks may be safely added to the cache,
    i.e., they are being accessed second time or the system is
    in a boot cache mode.

If the above conditions are met, the system reads the blocks found in the cache and writes as many blocks as it can (except blocks currently dirty and those that cannot be currently allocated in the cache).

According to the exemplary embodiment, the caching module has two layers: a filter for tracing and analyzing read access to the data blocks and a cache memory for keeping the actual data blocks. The cache memory includes two similar modules—a main cache and a boot cache. There is a small part of cache memory assigned for the boot cache. In the exemplary embodiment, the boot cache may be completely filled with data in a couple minutes after starting a booting system, which resides on a cluster storage (e.g., a VM), prior to getting a first read request requiring data caching. Then, the boot cache should be at least partially cleared for receiving new data. In the exemplary embodiment, the boot cache may have a limitation for the amount of data cached for one file or another data structure. Also, per user limitation can be established.

HDDs have large capacities and are inexpensive. However, HDDs are slow in terms of data access. SSDs are fast, but have lower capacity and are expensive. Therefore, the exemplary embodiment is intended for placing frequently used data on an SSD closer to a client, so the client spends less time accessing the data. This is implemented by using a persistent cache.

According to the exemplary embodiment, the cache uses the SSD and an index—i.e., storage of the metadata of the cached data. The metadata storage is implemented as two interconnected tables of file and block references. The reference tables and a table of checksums are parts of a cache file stored on the SSD. According to the exemplary embodiment, an algorithm for determining when to place data into the cache is provided. Two algorithms are used. One algorithm places frequently used data into the cache when more than one data access is detected. The second algorithm places data into the cache right after opening of the file. The second algorithm is used for loading systems stored on a cluster (e.g., VMs or containers). This implementation is referred to as boot cache. In order for the data placed into the cache by one algorithm not to be evicted by the data placed by another algorithm, the algorithm use two different memory areas residing in the same cache file.

In order to make a caching decision a history of data access is used. In the exemplary embodiment, the filter layer records the access history. The history comprises metadata also based on a combination of block and table reference files. However, this data is stored in the memory and not in the persistent storage. If the filter reflects a second data access, this data is cached.

The fast cache (boot cache) has high speed of read/write operations, which is suitable for system tasks such as system start up or restore, loading system data (e.g., directories of real or virtual disks). On the other hand, small volume of the boot cache can cause frequent deletion or eviction of data from the cache, for example, when a new data block needs to be loaded into a completely full cache file. Small files periodically evicted from the boot cache do not cause significant system slow down. However, some files can be continuously loaded into the boot cache, which reduces performance. In order to improve the performance, the filter layer is used, which keeps the boot cache use statistics and determines distribution of cached data across cache files.

Additionally, in order cache files efficiently, the block size can be tuned to better cache smaller or larger objects (than a default 64 KB block size). For example, for large objects it is efficient to use larger block size and for smaller objects—smaller ones. If the user requests 128 KB of interconnected data belonging to a large file (e.g., 100 MB), this data is treated as one block. In one embodiment, this data can be saved on slow storage or on a regular cache depending on a policy. If the data occupies the entire file it can be treated as several blocks. The block size can be limited by the physical capacity of the storage—e.g., 128 KB can be treated as two 64 KB blocks or as four 32 KB blocks. The virtual disk space is mapped in the cloud and the data blocks are treated as separate elements or as small files.

Operations with blocks of a large file result in loading some blocks and evicting others. If the data is processed once, the use of the boot cache is advantageous to the system. Otherwise, continuous eviction of the data blocks from the boot cache can decrease the efficiency of the system.

In order to increase the speed and efficiency, a filter layer is used. The filter detects a number of accesses to the blocks on the boot cache by the system and evicts the data blocks to the slow rotational cache. Since the data blocks are evenly distributed on HDD, the read speed can be high. In another embodiment, the system determines an order of blocks on HDD and distributes the blocks evicted from SSD for maximum system performance. In one embodiment, the system uses a pre-defined algorithm for distribution of data blocks on the disk and writes the blocks on HDD accordingly using an HDD controller driver. The simplest is sequential distribution. Note that rotational HDDs are very sensitive to the sequentiality of I/O requests. So if the sequential I/O executes with gaps in-between, it may become random from HDD point of view and may become much slower due to re-ordering with other requests.

According to another exemplary embodiment, the filter layer detects if the block has been already accessed at least twice within a set time period and places the block into a standard cache (i.e., an HDD). In one embodiment, if the requested file has been previously requested, but is not present on the boot cache, the file is moved to the boot cache for access and then is transferred to a standard cache as background process or upon modification by the user.

The filter layer and a boot and cache layers can be viewed as different entities. For example, the filter is a procedure, which intercepts and processes requests for read and write operations of data from the cloud storage. Also, the filter can be implemented as a data block of FUSE configurations, that determine a number of caches used and their use strategies. Thus, the filter can be a part of the file system. It can be defined as a layer of the file system with an unknown location.

The file system bitmap is used for generation of the filter. The bitmap of the file system is used as its base. If the file system element is requested, the state of the corresponding checkbox is changed. The checkbox can have two main states—copy into boot cache and copy into main cache. The intermediate states indicate that in a number of requests the main checkbox state needs to be changed. Alternatively, a life span (or lifetime) of the main checkbox and of the intermediate checkboxes can be used. The life span is used for zeroing out or dropping of the checkboxes after the expiration of the life span. In other words, if a frequently used block has not been requested since two day ago, the block is considered out of date and is copied into the boot cache on first request.

According to the exemplary embodiment, the caches can represent different entities. On one hand, the boot cache and the cache are spaces for copying data reserved on the SSD and the HDD. On the other hand, the caches are complex files with data structures. For example, bitmap entities of the file system can be located in the caches. The boot cache files and main cache file contain the bitmaps corresponding to data structures on the virtual disk of the cloud file system. A number of accesses and storage location are indicated by the bitmaps. For example, if the data block is saved on the main cache, the filter or the file system finds a corresponding bit in the bitmap and saves the data on the main cache. If the corresponding property is not found in the main cache bitmap, the system checks the boot cache bitmap. In one embodiment, the bitmaps are updated after the execution of the request.

Figure 1:
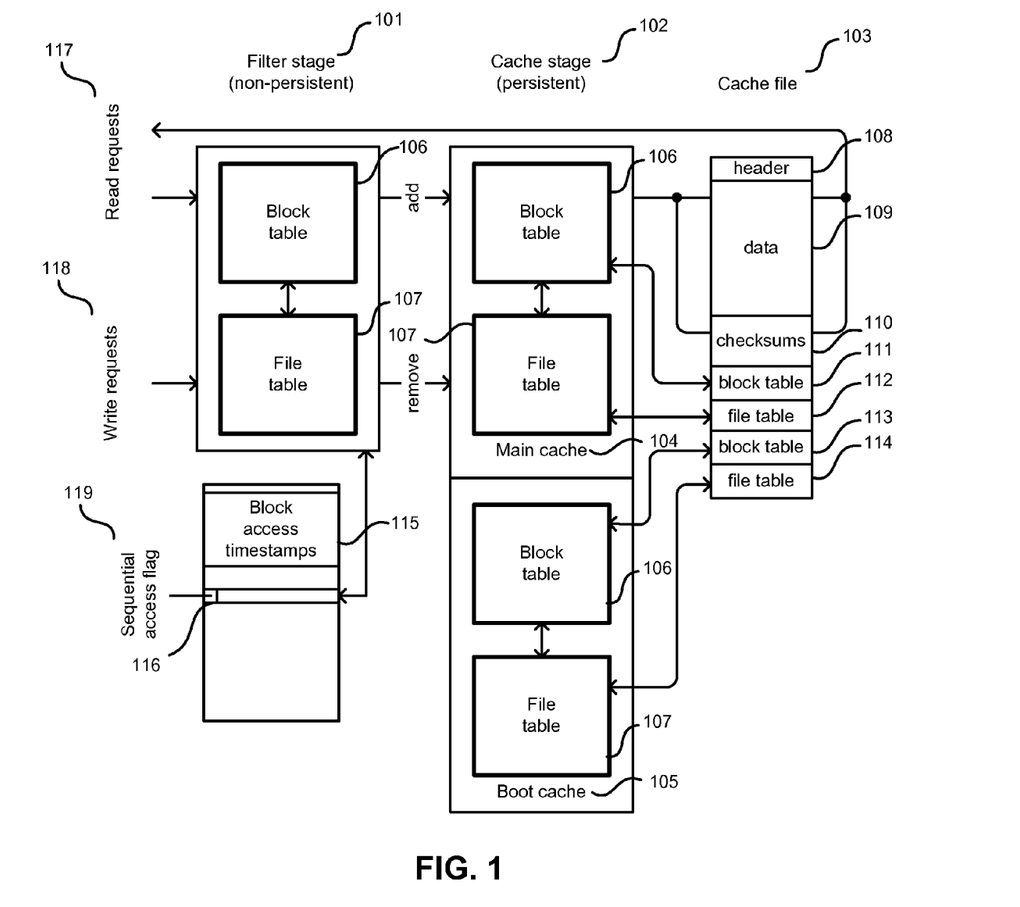
FIG. 1 represents a basic structure of the cache used in the exemplary embodiment.

According to an exemplary embodiment, cache modules with different functionality are depicted in FIG. 1. In the most common approach the caching system contains two modules:

1. A filter module 101 for collecting information related to requests for reading of cloud data; and
2. A cache itself 102 for storing the data in a form suitable for user issuing a read or write requests.

Note, that the cache may be physically placed near the user issuing requests or near the group of users. In the latter case, the filter detects read and write requests issued by several users and forces the system to store corresponding data blocks in the boot or in the regular caches. Even if each user requests certain block of data once, but several users request single shared block, the block may be stored in a regular cache.

In one embodiment of the invention, the system logic forces continuous removal of data from the boot cache, and the filter logic decides if the data should be continuously removed, or should be moved to the main cache. As an example, the level of the main cache usage may be used as a parameter for number of requests issued for a certain block before it becomes a candidate for moving to the main cache.

Write request 117 and read requests 118 as well sequential access requests 119 are intercepted by the filter 101. The cache itself consists of two modules or in other words—memory areas—a main cache 104 and a boot cache 105. The boot cache 105 is used for initial caching of data and is usually is filled with data during the short period of time after a first file access (i.e., in minutes or even seconds after the system launch). The boot cache 105 has a predefined or even fixed storage capacity and may also have a limit on the amount of data that can be put into the boot cache for the particular file or other data block (e.g., 128 MB or 1/32 of the cache size). The limit may be established for each user as well.

The main cache 104 has enlarged limits and may use the same hardware memory as a boot cache or may be placed on another server. If the data block is requested predefined number of times (e.g. two or three or more times), it is considered as popular and should be placed onto the main cache where it has long life relative to the boot cache. The filter 101 is used for detecting and marking such files or other data blocks.

When request for reading the block is issued for the first time, the block is reflected in the filter in any suitable form which provides possibility to identify a block. If a block already has a corresponding mark in the filter, next one or more subsequent requests should cause copying of the block from the cloud storage to the main cache. As an option, a marker or a flag of a block in the filter may live for limited time, and if the consequent requests are very rare, the block is cached in the boot cache only.

Additionally, the filter 101 detects continuous read access pattern and avoids caching data, if the data is read continuously beyond some limit (e.g., 512 KB). The cache 102 may use less or more of a persistent storage, (i.e., the content of the cache may reside on a non-volatile storage, not on RAM). The cache 102 consists of a main cache 104 and a boot cache 105. The entire cache content, including data blocks and metadata can be saved upon a shutdown and restored on a subsequent restart.

In one embodiment, the data stored in the cache is split into 64 KB blocks. Every saved block is accompanied by the checksum array 110 with a 4-byte CRC32 (for example) checksum stored per every page of the data 109 (4096 bytes). (Other identifiers, such as MD5 hashes, can also be used.) The data 109, checksums 110 and the metadata are stored in the single cache file 103. The size of the cache file 103 or other options of the entire cache and its parts may be configured using command line understandable by the system or by registry settings or the like. For example, the user can set up a cache size. An alignment size, a block size and a checksum page size are described in the cache file header 108 so they can be changed in the future, as needed (i.e., for performance and space efficiency optimization). For example, a block size can be tuned to better cache smaller or larger objects (then default 64 KB block size). For large objects it is efficient to use larger block size and for smaller objects—smaller size.

The cache file 103 includes checksums 110, block reference tables 111 and 113, as well as file reference tables 112 and 114. Both the filter and the cache layers consist of similar cache modules. Every cache module (out of the 3) includes the block table 106 and the file table 107, which is necessary to maintain cache consistency, and also stores some associated data. The cache layer 102 has the cached data blocks accompanied by checksums associated with it, while the filter layer has just the last read access timestamp 115 associated with every cache block. In case of sequential access, a special "dirty" bit flag 116 marks the block as locked for exclusive access.

Writing to the data block invalidates the data block in all modules. In case the file was written to by another client, all of its cached blocks will be invalidated. The block table 106 and the file table 107 have a fixed size so the least recently used objects (blocks and files) can be evicted by the recently added ones. Evicting the file from the corresponding table implicitly invalidates all the file's cached blocks.

The access to the data area 109 of the cache file 103 is performed using direct I/O operations to avoid unnecessary loading of the kernel cache. The data checksums area 110 is accessed in a cached mode, since the size of the data being read and written is small. The metadata (file header and block/file tables) are read on startup, kept in memory and ultimately written to a disk on a client shutdown. The client is a process which runs on behalf of the entire operating system rather than a particular user/client. This process terminates only on system shutdown. The block access is recorded and access time stamps 115 are stored.

Figure 2:
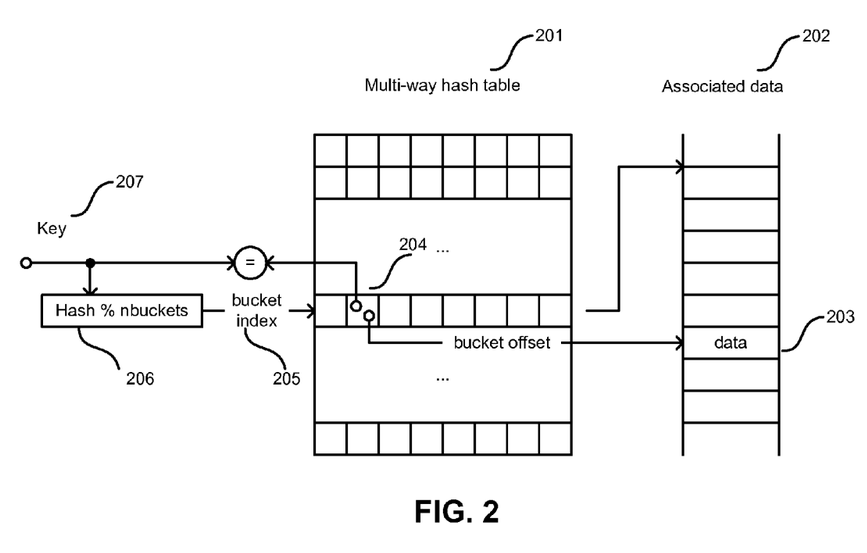
FIG. 2 illustrates an implementation of the multi-way hash table, in accordance with the exemplary embodiment.

According to the exemplary embodiment, both block tables and file tables (106 and 107) in both cache layers are based on the same structure—the multi-way hash table 201 depicted in FIG. 2, which shows an exemplary hash table with fixed size pre-allocated buckets 204 having eight entries. Every hash table entry 204 has a copy of the key 207, so searching for the particular key 207 is performed by comparing it with item's keys along the hash bucket whose index is calculated from the key's hash.

The items in the bucket form the LRU (least recently used) list, so the item can be popped up by moving it to the leftmost position in the bucket. In case a new item has to be added, the first empty position can be chosen, or the rightmost (oldest) used item can be overwritten. Thus, the new item (i.e., an entry) is usually popped up in its bucket either immediately or after a successful write of the associated data to a disk.

The hash items 204 do not have the pointers to the memory so they can be efficiently read and written directly from/to external storage as a continuous stream of data. The hash items 204 can efficiently maintain references to the external data storage 202, which keeps the block data 203 or data checksums. The external storage area 202, which keeps data 203 for the particular bucket 204, is addressed implicitly by the bucket index 205. In order to address the particular data item 204, every hash item 204 has the index 205 equal to the data item offset inside the bucket 204. Initially, all data items 204 (and corresponding indexes 205) are arranged sequentially, but popping up items inside the bucket will ultimately shuffle this array.

Figure 3:
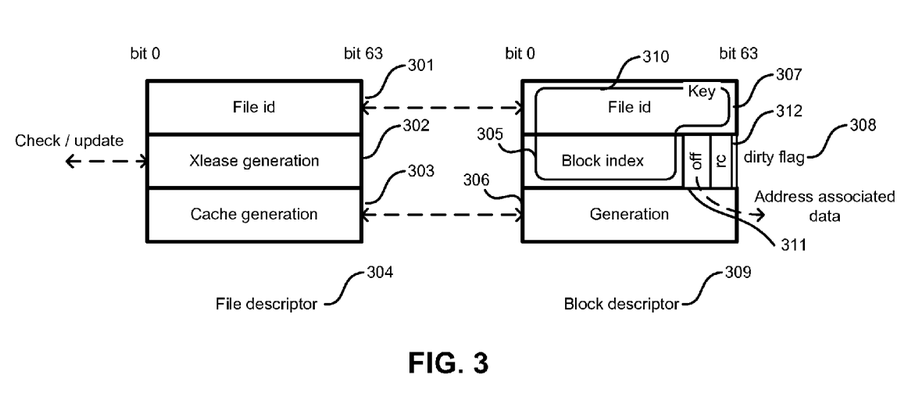
FIG. 3 illustrates an implementation of the file/block descriptors and consistency protocol, in accordance with the exemplary embodiment.

The file and block tables in both cache layers include the same 24 bytes structures outlined in FIG. 3. The block descriptor 309 keeps file unique ID 307 and the index 305 of the 64K block counting from the beginning of the file. These two fields constitute the key 310 uniquely identifying the particular block. The block index 305 occupies 6 bytes (which is enough to address $2^{64}$ bytes). The remaining 2 bytes are reserved for extra data facilitating addressing and maintaining of the associated data. The first byte is occupied by the bucket offset 311. The second byte is reserved for the reference counter 312. The reference to the block is added upon starting the IO operation to its associated data. As a reference is added, the reference counter is incremented.

The referenced blocks cannot be evicted, since there might be concurrent I/O operations to the same block related to its different "reincarnations." The blocks being read can be accessed concurrently, while the blocks being written can be referenced only exclusively. To distinguish between those two cases a high order bit of the reference counter is used. Setting this bit to equal to 1 marks the block as being dirty using flag 308 and, therefore, the block is locked for exclusive access.

Note that the flag 308 also automatically protects the reference counter from being overflowed by concurrent read requests. If there are too many requests, the block becomes exclusively locked, preventing readers from further reference acquisition. Byte-wide numbers larger than 127 have a most significant bit set which is used for locking the files. At client startup, every descriptor is examined by checking the bucket offset 311 and reference counter 312. Blocks with the dirty bit 308 set are invalidated immediately. According to the exemplary embodiment, any other non-zero reference count is silently reset.

The last field of the block descriptor is the generation 306 of the cached block. For a valid block it must match the generation of the file descriptor. The file table descriptor 304 has a unique file ID 301 as the key. It also keeps the exclusive lease generation 302 for that file. This number is updated by an MDS (i.e., a metadata server—see U.S. patent application Ser. No. 13/241,081, filed on Sep. 22, 2011, incorporated herein by reference) upon releasing the exclusive lease issued for the file.

The client receives the updated value on opening and closing of the file. The generation update occurred on file close is originated from the fuse itself so there is no need to invalidate the cache. On the other hand, the update detected on file open means that some other client has accessed the file on writing while the file was not kept open. Thus, all of the cached blocks must be invalidated in such cases. This means that storing the exclusive lease generation with every block is not suitable for efficient data management, because of performance considerations in cases when millions of data blocks have to be updated at once.

A separate generation number on each file and block descriptor is maintained. This cache generation number 303 in the file descriptor 304 is updated by setting it equal to the current exclusive lease generation 302 every time the cached content becomes invalid. On write access to the cached block, the block is invalidated by setting the generation value to zero. The initial generation for the valid block is equal to the exclusive lease generation at the time of its creation. Note that any matched pair of numbers is sufficient. The lease generation is a convenience source of these numbers. The numbers can be considered as lease generation at the time of the cached content was first added to the cache.

Figure 4:
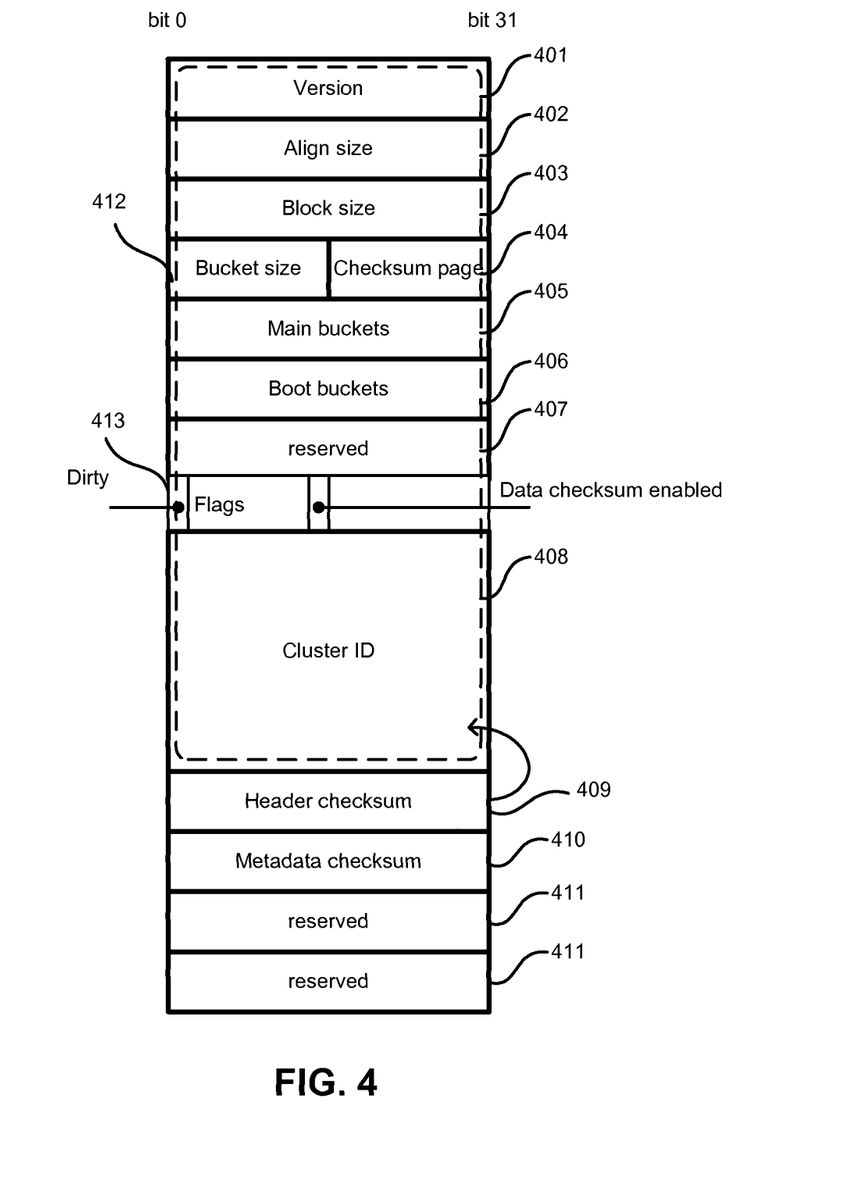
FIG. 4 illustrates the content of the cache file header used in the exemplary embodiment.

According to the exemplary embodiment, the entire cache file is tagged by the header structure depicted in FIG. 4. The header structure contains a version number 401 the size constants align size 402, block size 403, bucket size 412, checksum page 404, main buckets 405 and boot buckets 406 and reserved block 407. Note that the sizes are needed to locate data in the cache file. Arbitrary sizes can be used. According to the exemplary embodiment, the same number of buckets in block and file tables is used, so there is a space for one file descriptor per every cached block.

Also, the descriptor keeps the CRC32 checksum 409 of the block and file tables as well as the checksum 410 of the constant part of the header itself. Upon the client startup procedure, the dirty bit 413 in the flag's field is set. On the client shutdown, the dirty bit is cleared after successful flushing of the metadata to disk. The cluster ID 408 is also stored in the file header to prevent using an old cache with a new cluster, which may lead to reading the wrong data.

The cache can be operated in two modes: with checksum protection of the cached data and without it. The corresponding bit of the flags field is set accordingly at startup. The corresponding portion of the cache file has always reserved spaces 411 for storing checksums, regardless if this feature is enabled. Cache write rate has the following limitation—writing data to the cache should not affect reading, so it has lower priority. Writing to the cache is allowed when one of the following conditions is met:

there are no reads in progress and less than 4 writes are in progress;

some reads are in progress, but not writes are in progress, and at least 1 msec has elapsed since the last write.

This is done to avoid stress on the storage, which can be used for other IO activities of a higher priority for the user.

To address cache buckets, a simple Knuth's multiplicative hash is used, calculated as the sum of the file unique ID and the index of the cache block (counted from beginning of the file) multiplied by the number 2654435761. Since it is possible to mount the same cluster more than once, it is necessary to protect cache file from being accessed by multiple client instances at a time. To accomplish this task, the client acquires an advisory lock on the cache file right after opening it.

According to the exemplary embodiment, the sequential reads detection is addressed. The backup tools can stress cache by reading the entire file system content. Therefore, the sequential reading patterns need to be detected to protect from such scenario. The timestamps of every block read access are recorded as an array of 16-bit numbers (expressing time in minutes) associated with cache filtering layer. The high order bit is reserved for the sequential access flag set by the sequential read detection procedure.

The read is considered sequential, if all blocks within the 512 KB, prior to the current one, have been accessed within the last 3 minutes. Such algorithm allows for detection of even multiple concurrent sequential reads. The sequential read may only read data from the cache with some additional limitations (see below). The non-sequential access to the block with sequential flag set does not cause the block to be cached—it just resets the sequential flag.

Even when the content that is being read continuously is found in the cache, the interlaced I/O patterns need to be taken into account, where some data is being read from the cluster with the gaps read from the cache. Such patterns may seriously degrade I/O performance in comparison with a pure sequential read. So when the read is sequential, the system checks if the next 512 KB of the file data is also cached. If not, then the entire request is going to the cluster. The goal is to avoid splitting the continuous request onto the number of parts with gaps in between. Such gaps may lead to excessive HDD head repositioning slowing down IO performance.

Note that rotational HDDs are very sensitive to the sequentially of I/O requests. So if sequential I/O comes with gaps in-between it may become random from the HDD point of view and become much slower due to re-ordering with other requests. Accordingly, the goal of the proposed embodiment is to avoid splitting the continuous requests onto the number of parts with gaps in between. Such gaps may lead to excessive HDD head repositioning that slows down the IO performance.

On startup, the system first checks the cache file header and creates a new empty cache if necessary. If the header is correct and matches the desired cache parameters, the system reads the cache metadata. An advantage of this cache implementation is that the entire cache table data can be saved to a disk and subsequently loaded without any processing. Thus, the checksum is calculated upon metadata loading and compared with the one saved in the file header. The last step consists of checking the metadata for errors by verifying the bucket offsets and dropping the dirty data blocks. When done with loading, the dirty bit in the cache file header is set and synchronized to the disk.

On shutdown, the metadata is saved to a disk while calculating the checksum at the same time. Completion of the writes in progress is optional, since time may be limited during system shutdown. The corresponding dirty blocks will be dropped on next cache load. Finally, the cache file is synched to disk, the dirty bit is cleared and the file is synched again.

The cache lookup is performed for the entire array of the file blocks being accessed by the read request. The procedure is implemented as follows.

First, the process looks up every block in the filter layer, as well as in the main and boot caches. If the block is not found in the filter, the process adds the block and updates access timestamp. The timestamps are used for sequential access detection. The continuous reads are treated separately. Reading of the cached content on continuous read is allowed only if all requested blocks and the next 512 KB past the initial offset are in the cache. For non-sequential access one of the following conditions must be met:

some data blocks are in cache;
all requested data blocks can be safely added to the cache, i.e. they are being accessed for a second time or the process is in the boot cache mode. The second time access means that the block is marked as already accessed in the filter layer. Then, the system can read blocks found in the cache and write as many blocks as it can (except for the blocks that are currently dirty and those that cannot be currently allocated in the cache). Those skilled in the art will appreciate that the cache invalidation is specific to the cloud storage.

Figure 5:
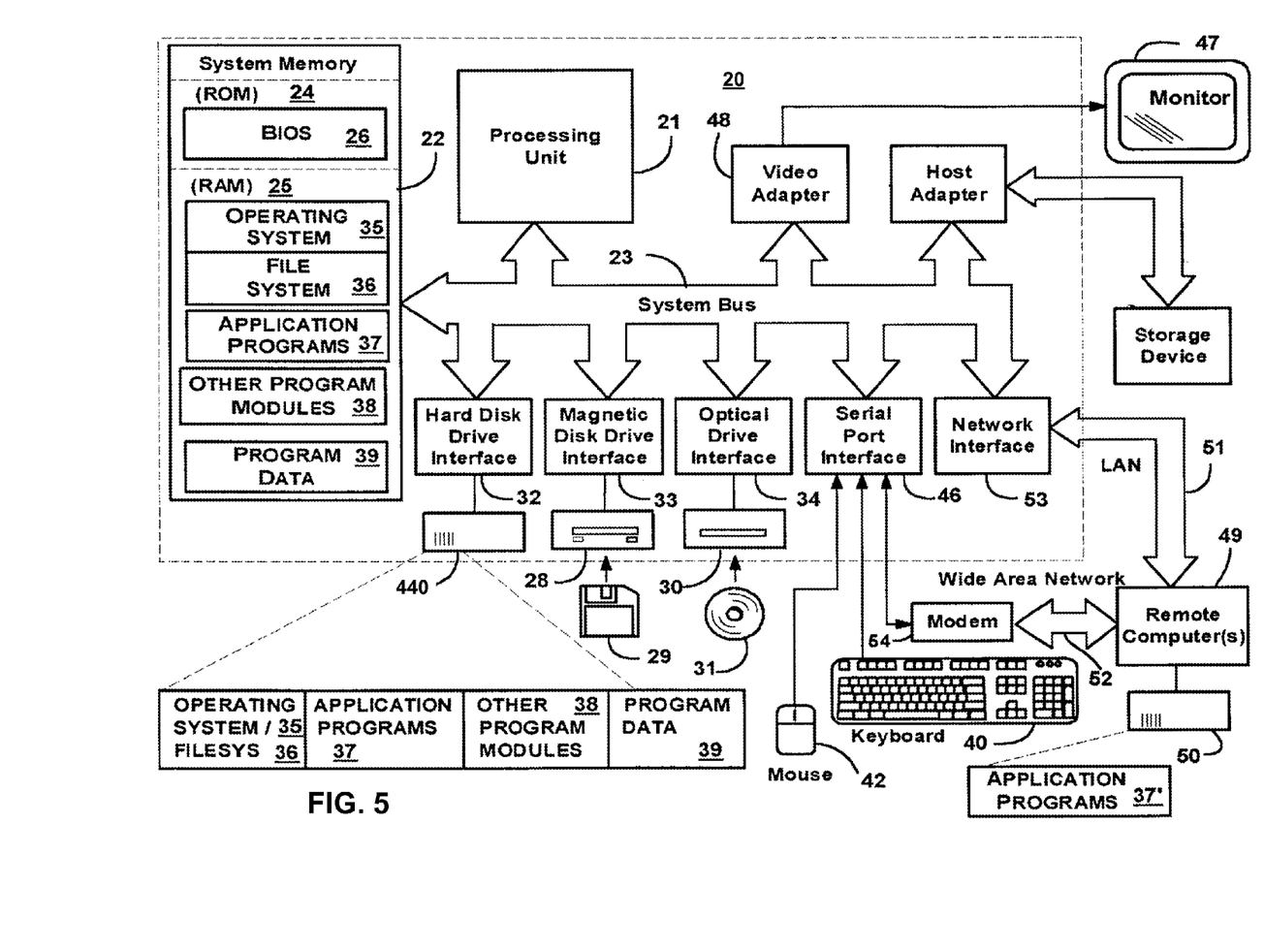
FIG. 5 illustrates a schematic of an exemplary computer system that can be used for implementation of the invention.

With reference to FIG. 5, an exemplary remote computer system for implementing the invention includes a general purpose computing device in the form of a computer 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented method for cache management, the method comprising:
   maintaining a block table in a non-persistent filter layer of a Solid State Drive cache;
   maintaining a file table associated with the block table;
   writing the block table and the file table into a main cache and into a boot cache of a persistent cache layer;
   providing a record of access to the block table of the non-persistent filter layer when a read request is received at the non-persistent filter layer;
   removing all records of access from the block table in the main cache and from the block table in the boot cache when a write request is received at the non-persistent filter layer;
   generating a checksum array for each data block;
   tracing read access to the data blocks using the non-persistent filter layer; and
   storing the each data block into the main cache or the boot cache,
   wherein a checksum of a file, file data, a block access time stamp and a metadata of the file are stored in a single cache file in the Solid State Drive cache.

2. The method of claim 1, further comprising setting a continuous access limit.

3. The method of claim 2, further comprising detecting a continuous access pattern and preventing caching of the data, when the data is read continuously beyond the continuous access limit.

4. The method of claim 1, further comprising selecting the each data block that have been read at least twice and placing the each data block into the main cache.

5. The method of claim 4, wherein the each data block is selected using the access time stamps.

6. The method of claim 1, wherein the cache file has a header that describes any of:
   an alignment size;
   a block size; and
   a checksum page size.

7. The method of claim 1, wherein a write to a particular data block invalidates the particular data block in the main cache.

8. The method of claim 1, wherein the copying of the block table and the file table into a main cache of the persistent cache layer is executed on a graceful shutdown.

9. The method of claim 1, wherein writing to a particular data block invalidates the particular data block in the main cache and in the boot cache.

10. The method of claim 1, further comprising determining oldest data objects by the access time stamps.

11. The method of claim 10, further comprising evicting oldest data objects that are replaced by recently added data objects in the cache file.

12. The method of claim 1, wherein the non-persistent filter layer and the cache layer are based on a multi-way hash table.

13. The method of claim 12, wherein the multi-way hash table uses Knuth's multiplicative hash values.

14. The method of claim 1, wherein an updated data is passed to a client on opening and closing of the file.

15. The method of claim 1, wherein the marking the file with the flag for exclusive access comprises setting a file dirty bit.

16. The method of claim 15, further comprising clearing the dirty bit at a client shutdown.

17. The method of claim 1, further comprising maintaining a separate generation number for each file and block descriptor.

18. The method of claim 17, further comprising invalidating the file upon a write operation by setting the generation number to zero.

19. The method of claim 1, further comprising marking a file with a flag for exclusive access, when sequential access is requested.

20. A system for cache management, the system comprising:
   a processor;
   a memory coupled to the processor;
   a computer program logic stored in the memory and executed on the processor, the computer program logic configured to execute the steps of claim 1.

21. A system for cache management, the system comprising:
   a processor and a memory containing computer code and data to implement the following:
   a Solid State Drive cache containing a block table in a non-persistent filter layer;
   a file table associated with the block table;

wherein the block table and the file table are stored in a main cache and in a boot cache of a persistent cache layer;

a record of access written to the block table of the non-persistent filter layer when a read request is received at the non-persistent filter layer, wherein all records of access are removed from the block table in the main cache and from the block table in the boot cache when a write request is received at the non-persistent filter layer;

a checksum array for each data block;

wherein the non-persistent filter layer traces read access to the each data block;

wherein the each data block is saved into the main cache or the boot cache, and wherein a checksum of a file, file data, a block access time stamp and a metadata of the file are stored in a single cache file in the Solid State Drive cache.

22. A system for cache management, the system comprising:

a processor and a memory containing computer code to implement the following:

a Solid State Drive cache containing a block table in a filter layer;

a file table associated with the block table;

wherein the block table and the file table are stored in a main cache and in a boot cache of a persistent cache layer;

a block access record written to the block table of the filter layer after a read request, wherein block access records are deleted after a write request; and a checksum array for each data block, wherein the filter layer traces read access to the each data block;

wherein the each data block is saved into the main cache or the boot cache, and wherein a checksum of a file, file data and a block access time stamp are stored in a single cache file in the Solid State Drive cache.

* * * * *